Figure 29:
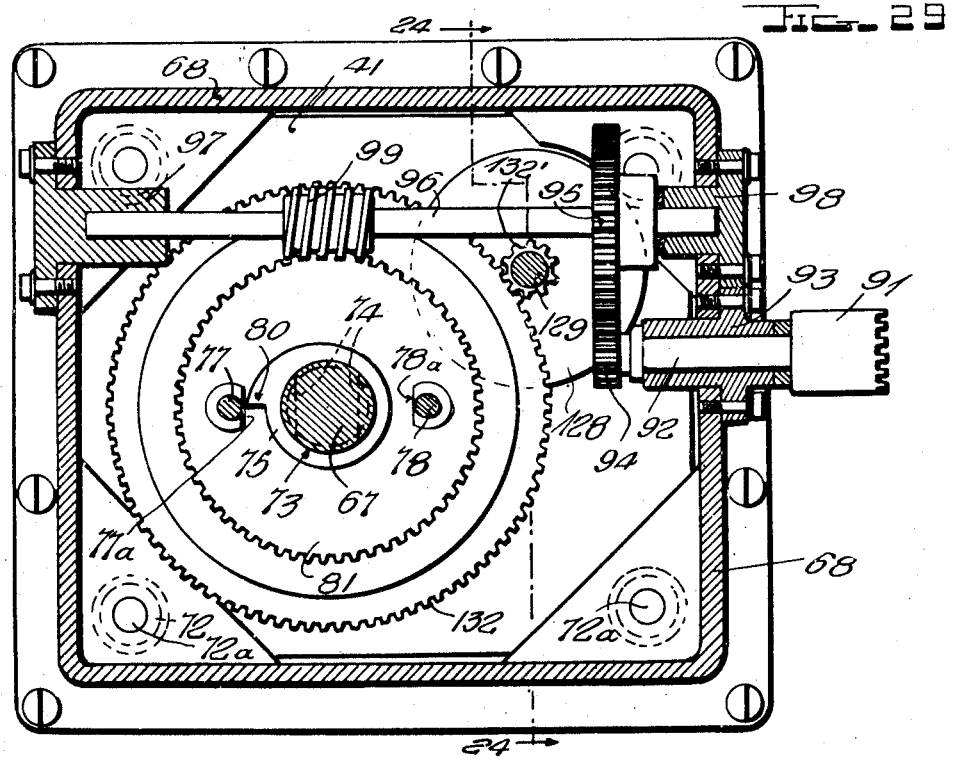

Sept. 27, 1949.　　　　J. F. FRESE　　　　2,482,757
MOTOR OPERATED SWITCH
Original Filed April 27, 1944　　　　11 Sheets-Sheet 1
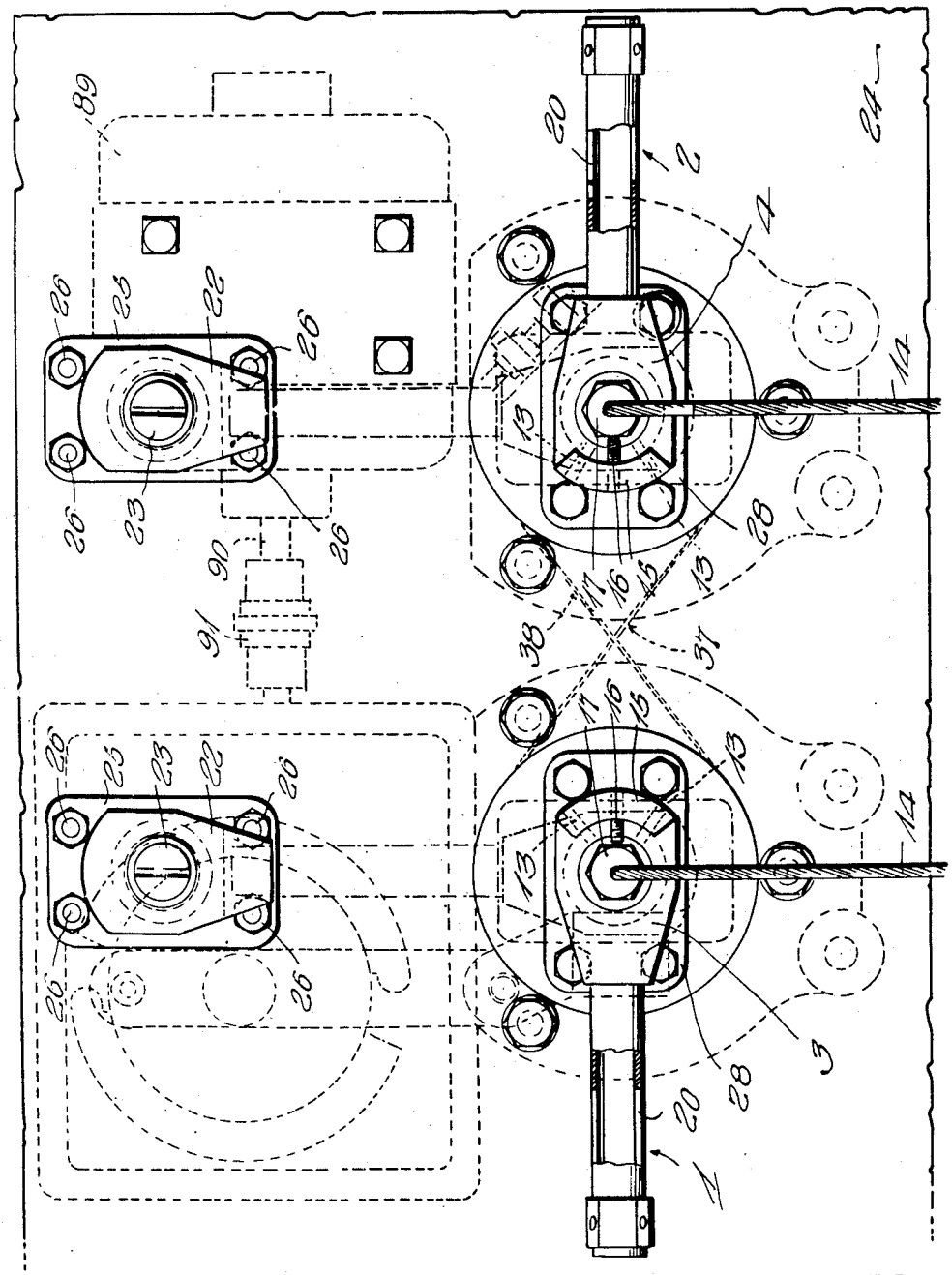
INVENTOR.
Joseph F. Frese,
BY
John B. Brady
ATTORNEY Sept. 27, 1949.  J. F. FRESE  2,482,757
MOTOR OPERATED SWITCH
Original Filed April 27, 1944  11 Sheets-Sheet 2
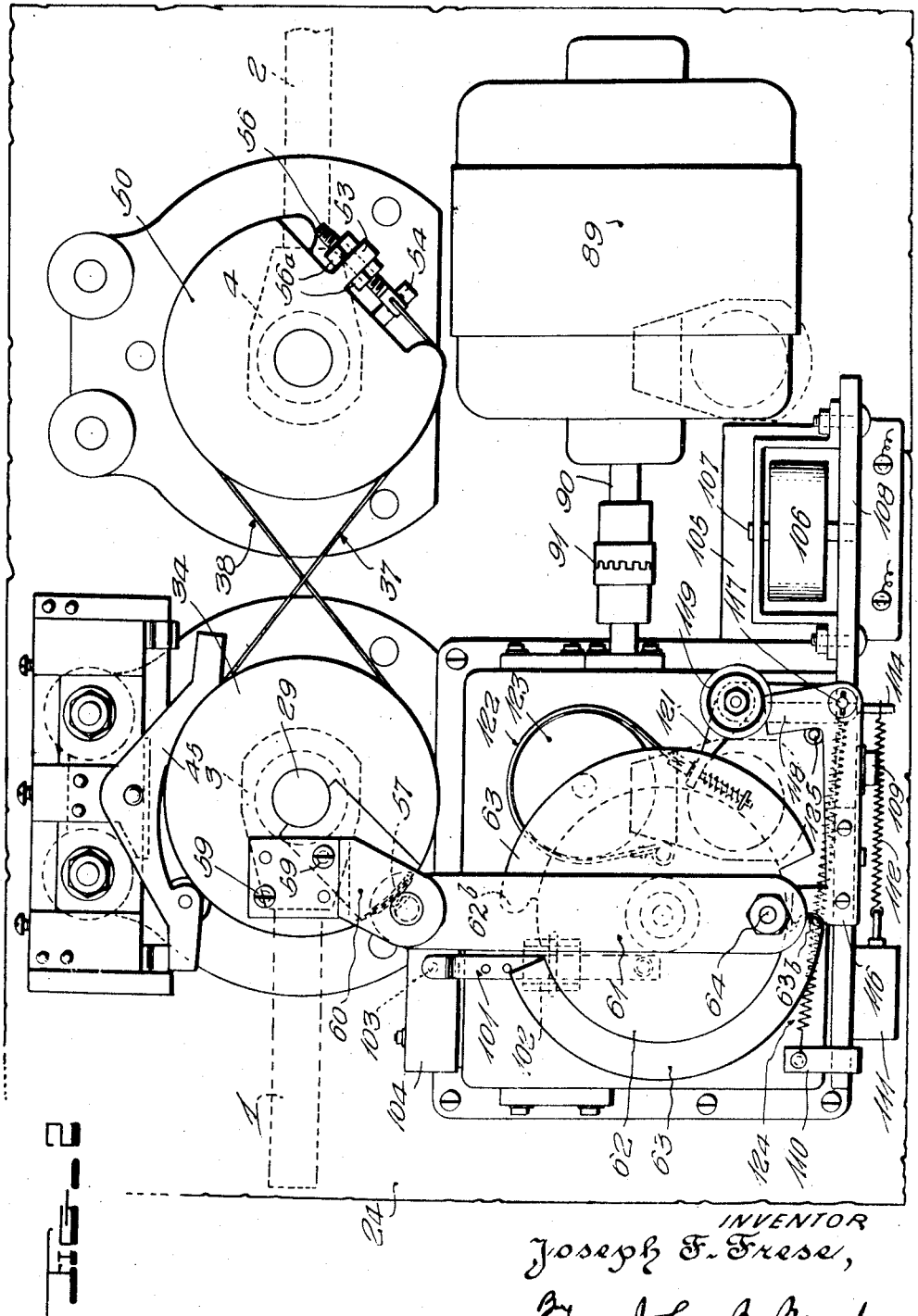
INVENTOR
Joseph F. Frese,
By John B. Brady
ATTORNEY Sept. 27, 1949.  J. F. FRESE  2,482,757
MOTOR OPERATED SWITCH
Original Filed April 27, 1944  11 Sheets-Sheet 3
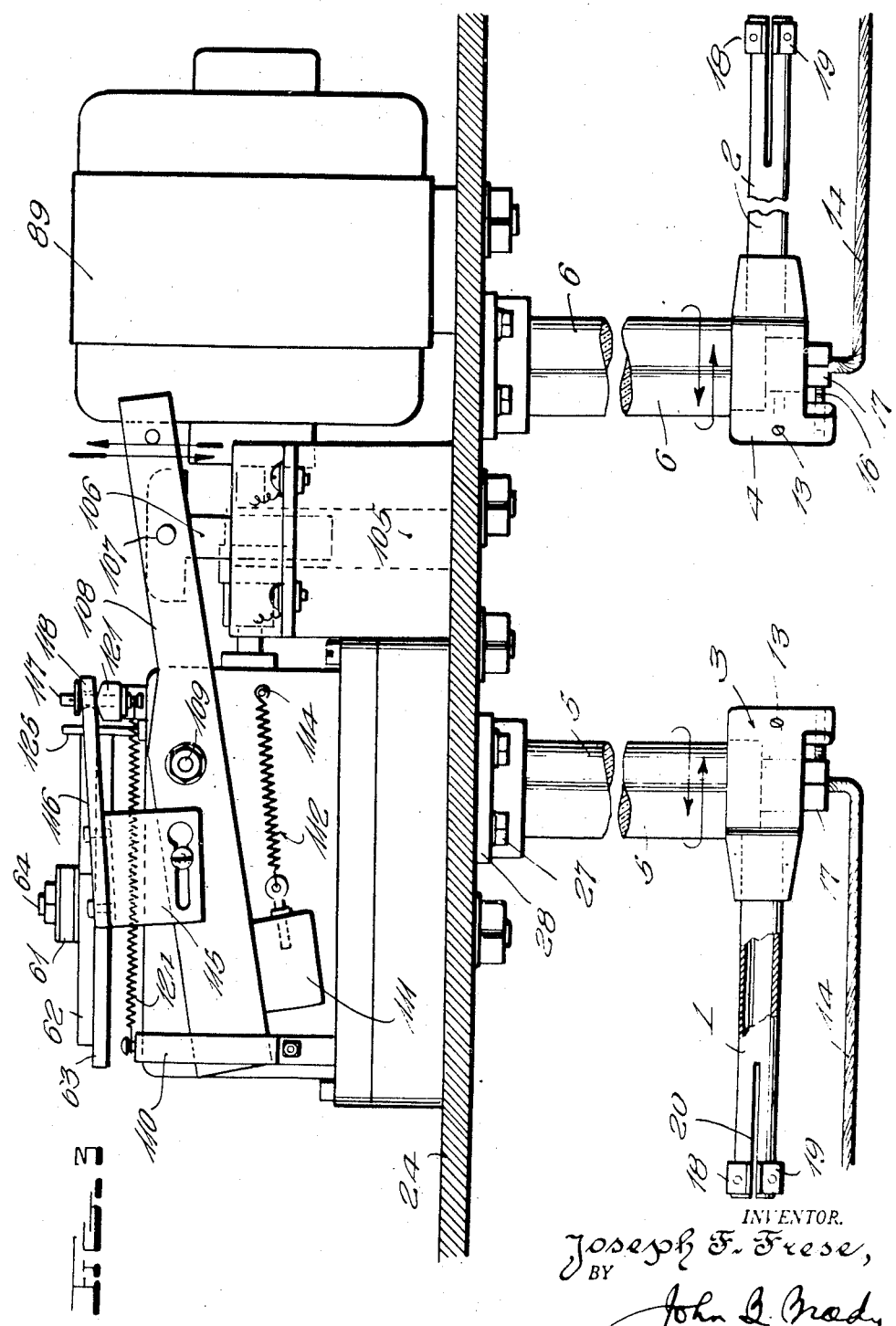

Sept. 27, 1949.  J. F. FRESE  2,482,757
MOTOR OPERATED SWITCH
Original Filed April 27, 1944  11 Sheets-Sheet 4
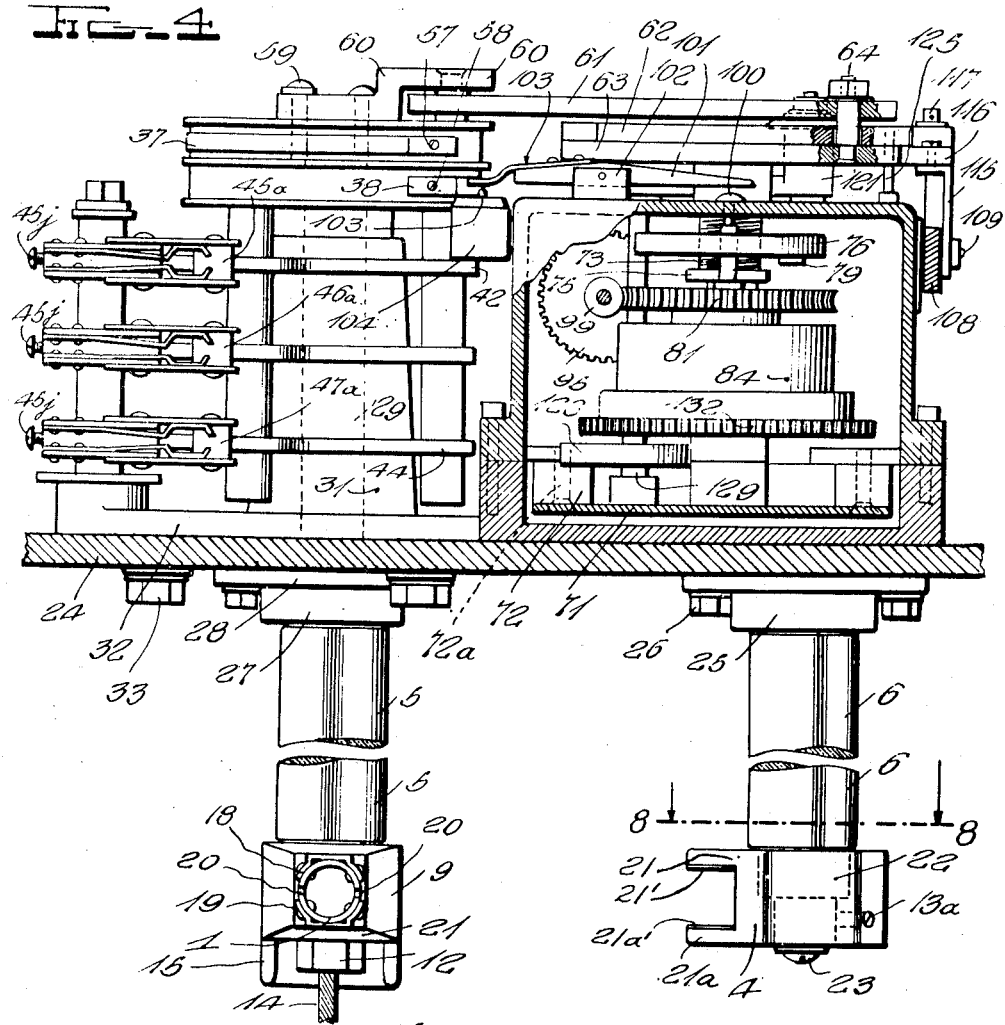
INVENTOR
Joseph F. Frese,
By John B. Brady
ATTORNEY Sept. 27, 1949. J. F. FRESE 2,482,757
MOTOR OPERATED SWITCH
Original Filed April 27, 1944 11 Sheets-Sheet 5
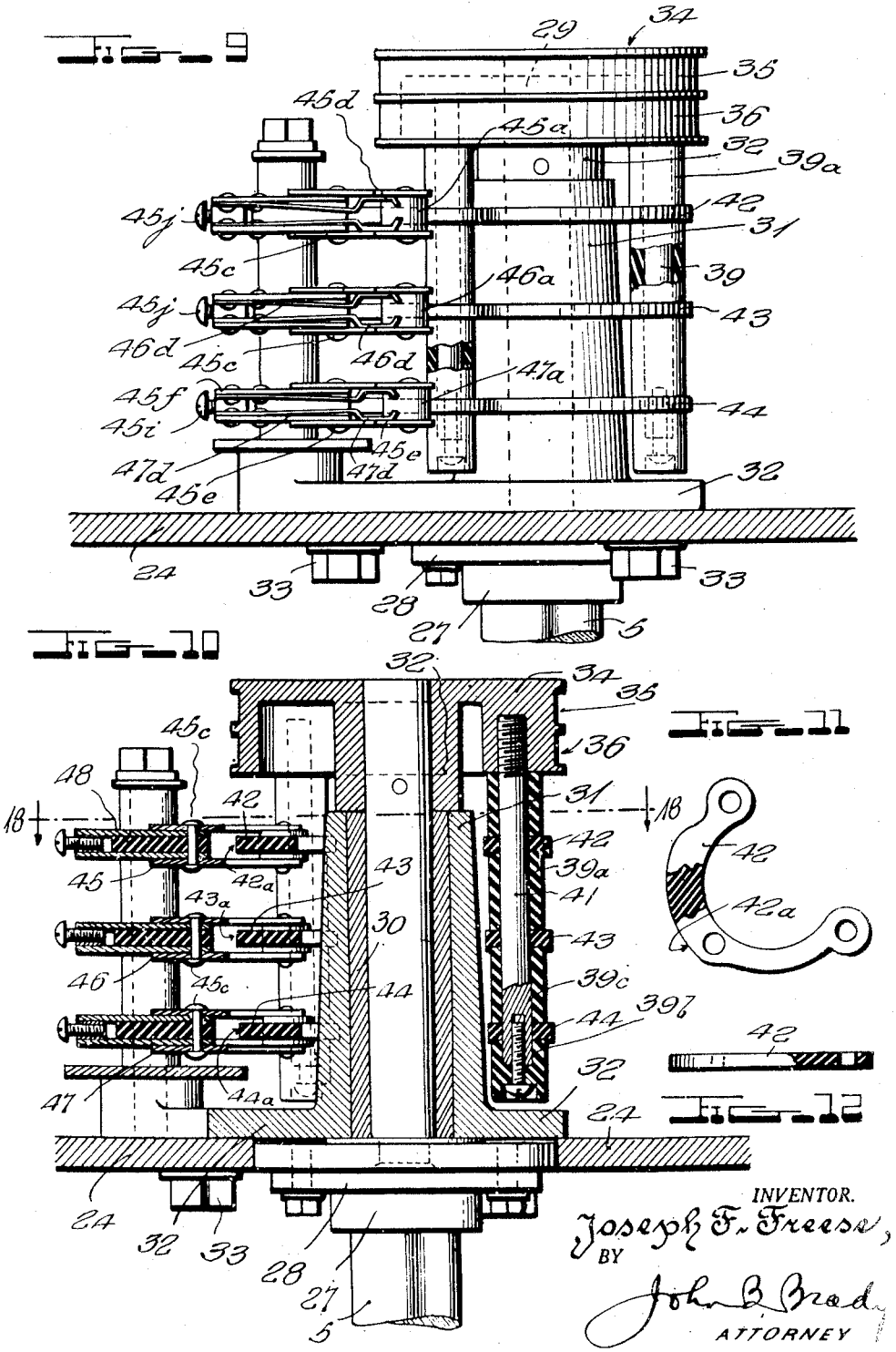

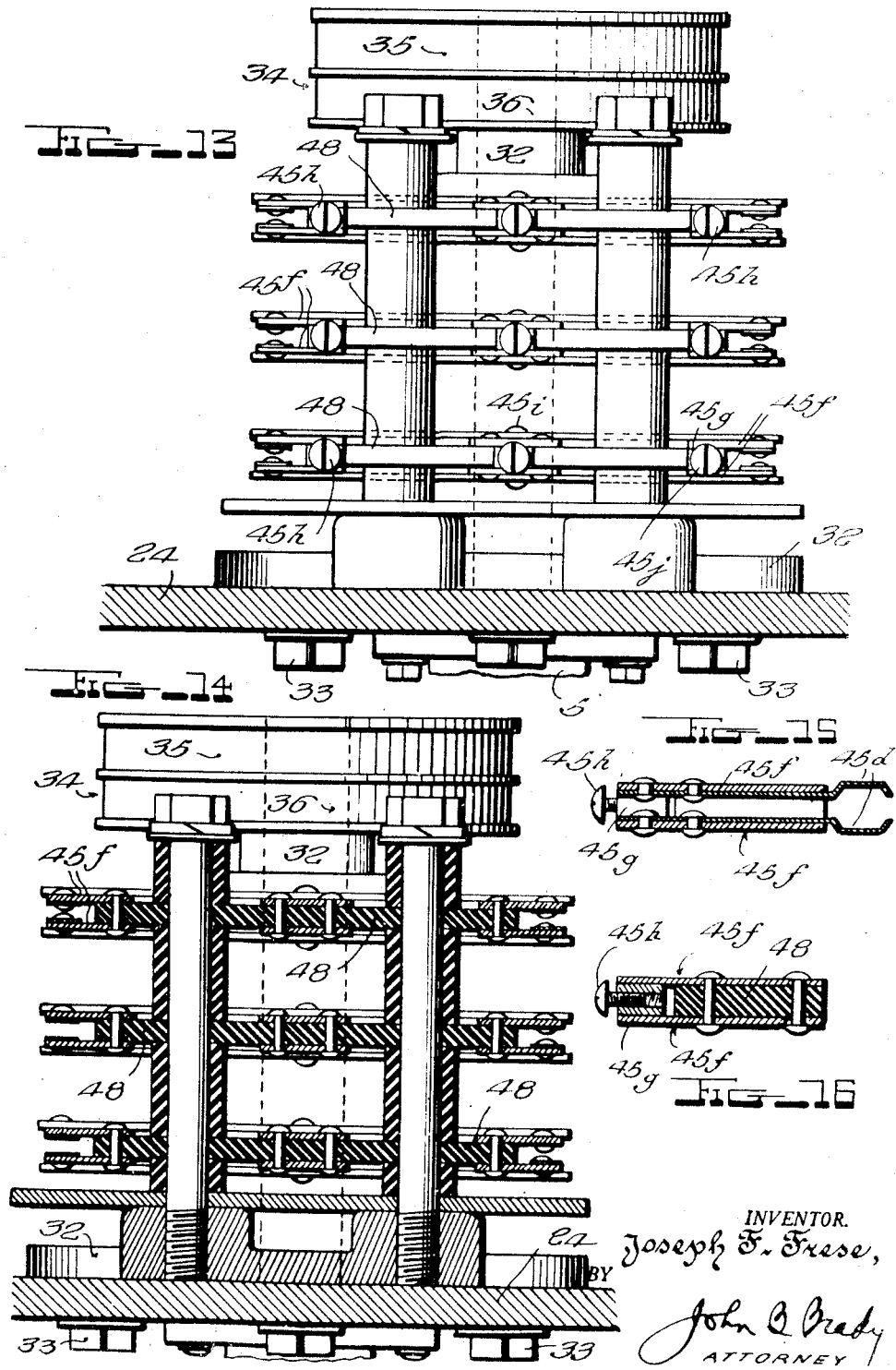

Sept. 27, 1949.  J. F. FRESE  2,482,757
MOTOR OPERATED SWITCH
Original Filed April 27, 1944  11 Sheets-Sheet 7
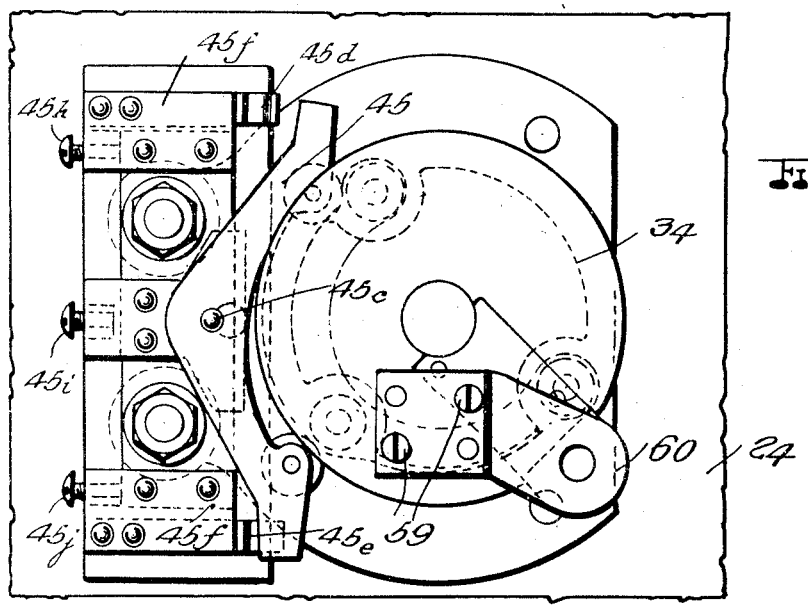
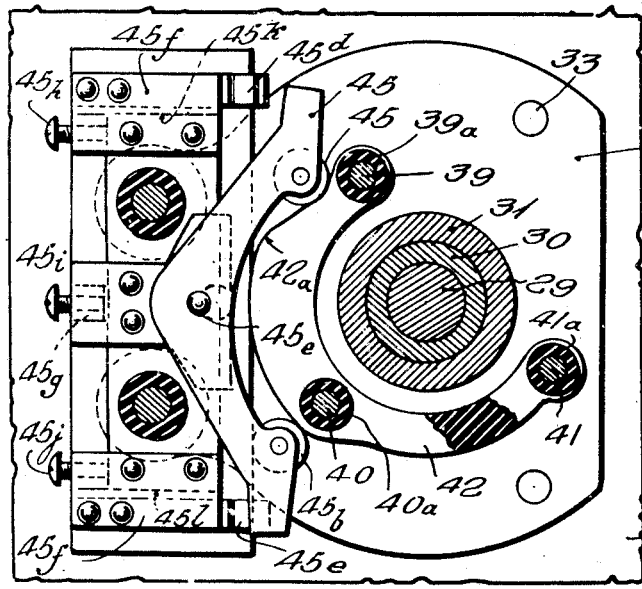
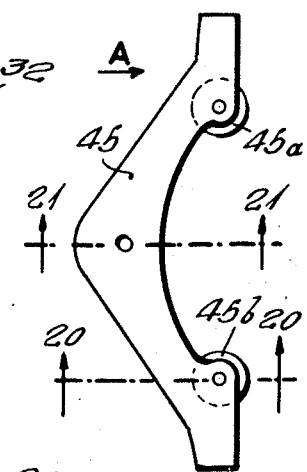
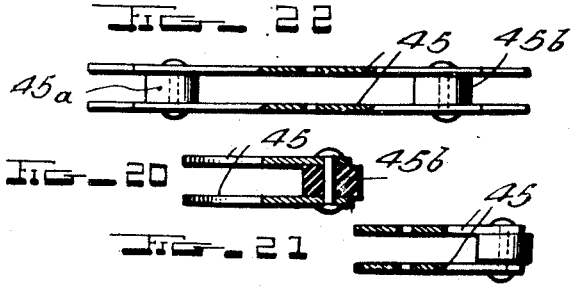
INVENTOR.
Joseph F. Frese,
BY
John B. Brady
ATTORNEY

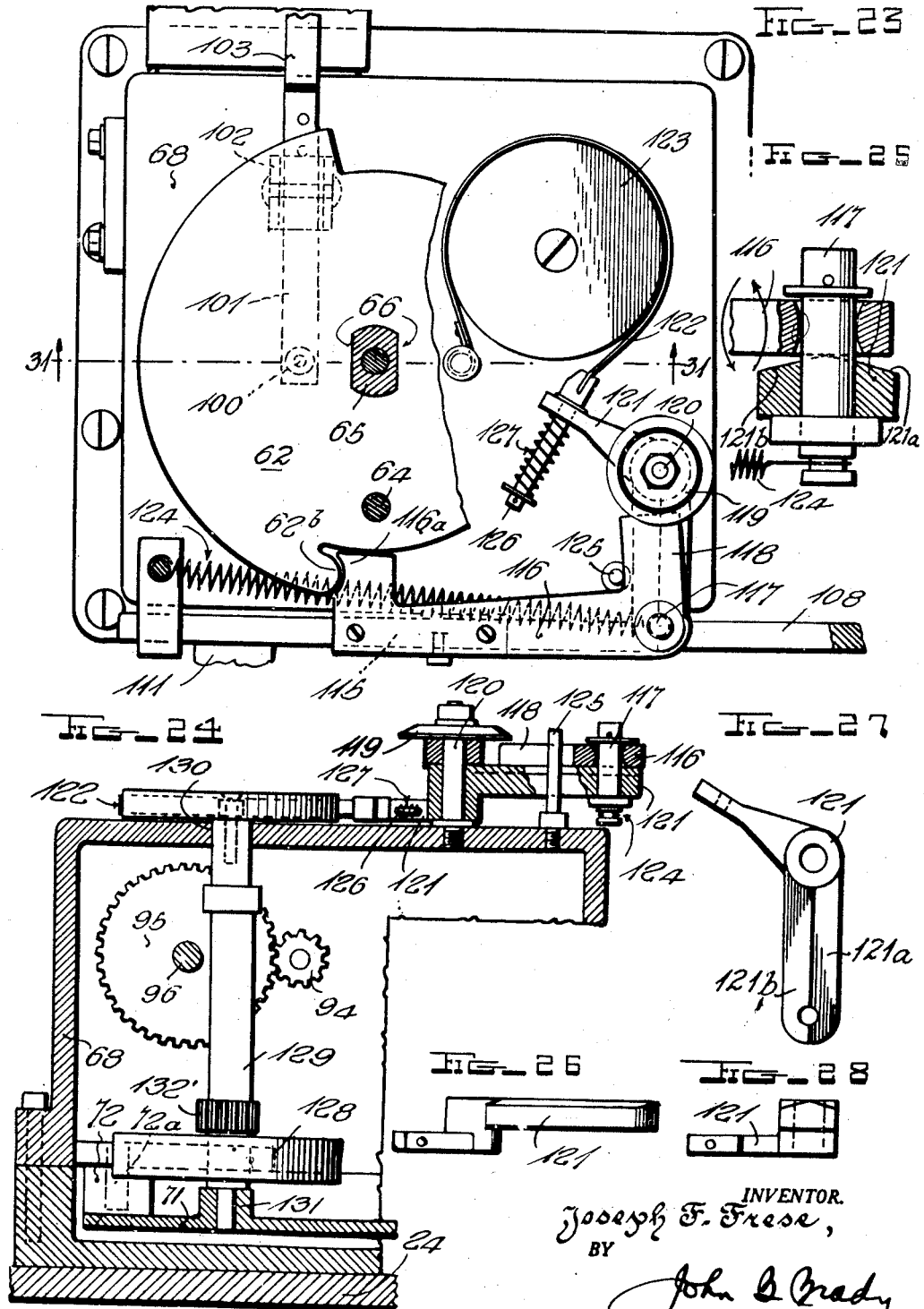

Sept. 27, 1949.    J. F. FRESE    2,482,757
MOTOR OPERATED SWITCH

Original Filed April 27, 1944    11 Sheets-Sheet 9

INVENTOR.
Joseph F. Frese,
BY
John C. Brady
ATTORNEY

Sept. 27, 1949. J. F. FRESE 2,482,757
MOTOR OPERATED SWITCH
Original Filed April 27, 1944 11 Sheets-Sheet 10
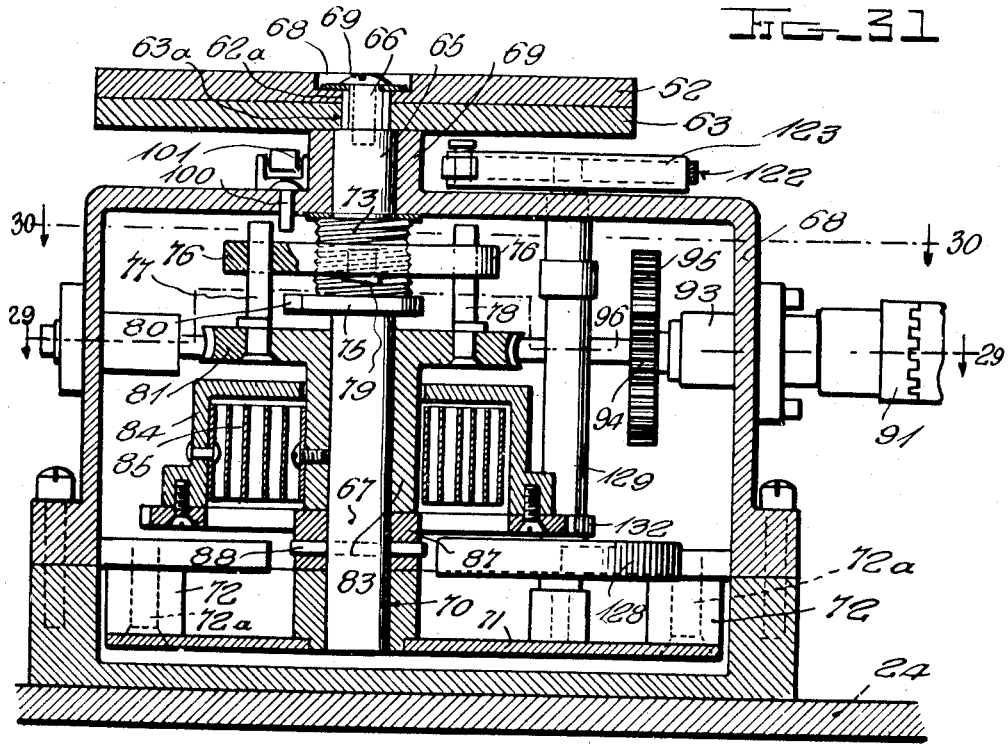

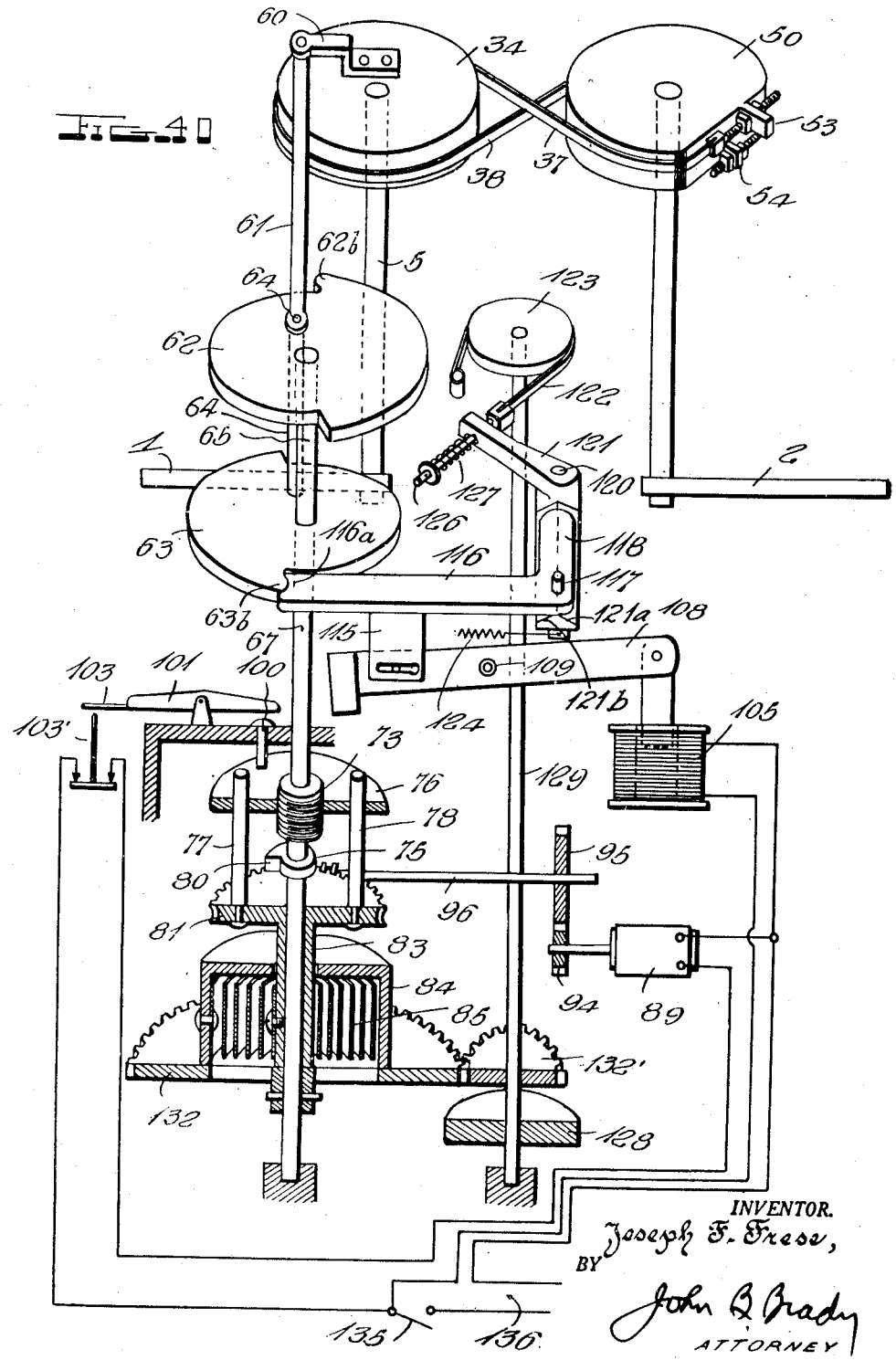

Patented Sept. 27, 1949

2,482,757

UNITED STATES PATENT OFFICE 2,482,757

MOTOR OPERATED SWITCH

Joseph F. Frese, Baltimore, Md., assignor to The Monitor Controller Company, Baltimore, Md., a corporation of Maryland Original application April 27, 1944, Serial No. 533,010. Divided and this application June 6, 1945, Serial No. 597,763

3 Claims. (Cl. 200—92)

My invention relates broadly to electrical switches and more particularly to an automatically operated electric switch system.

This application is a division of my application Serial Number 533,010, filed April 27, 1944, for Automatic electric switch and contactor system.

One of the objects of my invention is to provide an arrangement of spring driven electric switch which may be instantaneously actuated by rendering the spring effective to drive the switch.

Another object of my invention is to provide a remotely controlled automatic switch that may be opened and/or closed under control of a spring motor which is conditioned from time to time by an electric motor.

Another object of my invention is to provide an arrangement of high potential switch which may be moved to open or closed position under control of a spring driven motor at uniform speed where the spring driven motor is wound from time to time under control of an electric motor.

Still another object of my invention is to provide a construction of spring governed switch having an electric motor winding device associated therewith and in which a multiplicity of coacting auxiliary contacts are controlled synchronously with the operation of the switch.

A still further object of my invention is to provide a construction of electric switch in which a pair of switch arms may be automatically moved in opposite directions simultaneously under control of a spring motor actuator for opening and/or closing electric circuits.

Still another object of my invention is to provide a construction of spring operated actuator for driving the arms of an electric switch system where the spring operator is wound from time to time as required by an electric motor.

A further object of my invention is to provide a construction of auxiliary contact system operated by cam devices controlled by the movement of the electric switch system of my invention.

Still another object of my invention is to provide a high potential switch system including insulators for mounting angularly movable arms having contactors thereon in combination with mechanism for moving the arms in clockwise and counter-clockwise directions for making and breaking connection with stationary contacts insulatedly mounted in alignment with the switch arms.

Still another object of my invention is to provide a construction of reverse drive mechanism for a pair of electric switches with means for simultaneously moving the electric switches in opposite directions with respect to each other for making or breaking coacting electrical connections.

Figure 30:
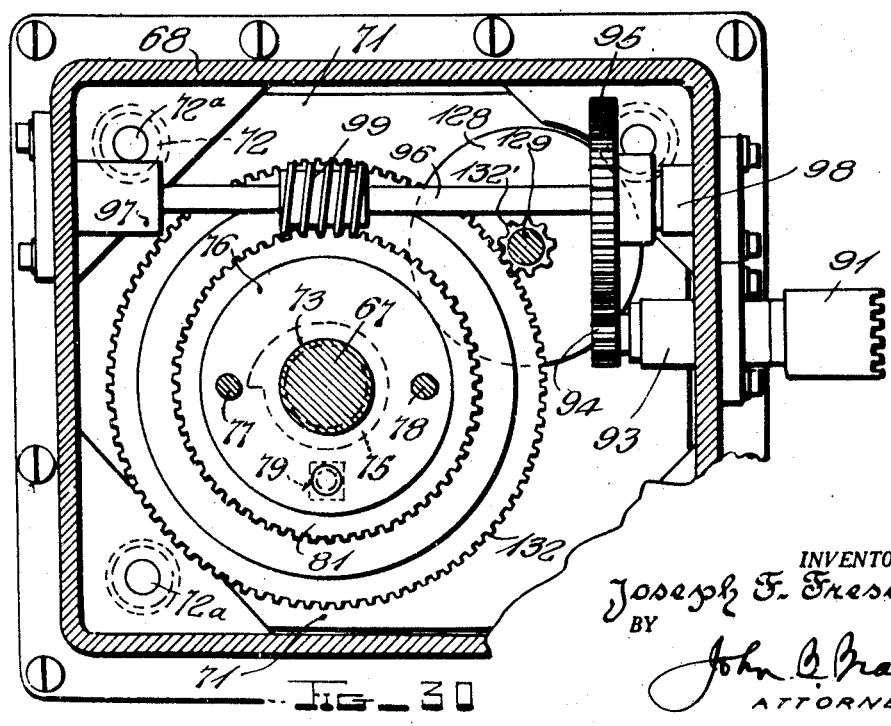

Other and further objects of my invention reside in the construction and arrangement of parts of the automatic switch as set forth in the accompanying specification and shown in the accompanying drawings in which:

Figure 1 is a plan view of the automatic switch system and actuator therefor; Fig. 2 is a top plan view of the automatic switch system and drive therefor; Fig. 3 is a side view of the automatic switch system and actuator; Fig. 4 is a view illustrating the arrangement of auxiliary contacts in association with one of the switch arms and illustrating the automatic drive control mechanism in association therewith; Fig. 5 is a plan view showing one of the switch arms carried by the insulator; Fig. 6 is an end view of the hardware which supports the switch arm with respect to the insulator; Fig. 7 is a cross sectional view through the hardware and insulator showing the support of the switch arm thereby; Fig. 8 is a transverse sectional view taken on line 8—8 of Fig. 4 illustrating the stationary contact which is carried by an insulator mounted on the apparatus panel; Fig. 9 is a plan view showing the auxiliary contacts and the arrangement of cams for controlling the contacts synchronously with the movement of the switch arm; Fig. 10 is a longitudinal sectional view through the cam control mechanism for the auxiliary contacts; Fig. 11 is a detailed elevational view of one of the cams formed from insulation material for actuating the auxiliary contacts; Fig. 12 is an end view of the cam illustrated in Fig. 11; Fig. 13 is a top plan view of the auxiliary contacts and actuating cams associated therewith; Fig. 14 is a longitudinal sectional view through the auxiliary contact system; Fig. 15 is a detailed sectional view showing the arrangement of one of the contactors of the auxiliary contacts; Fig. 16 is a detailed view of one of the auxiliary contacts showing the method of establishing electrical connection therewith; Fig. 17 is an end view illustrating the arrangement of the auxiliary contacts and the cam actuator for controlling the contacts; Fig. 18 is a transverse sectional view with certain of the parts illustrated in side elevation taken on line 18—18 of Fig. 10; Fig. 19 is an elevational view of one of the movable sections of the auxiliary contact system; Fig. 20 is a transverse sectional view taken on line 20—20 of Fig. 19; Fig. 21 is a transverse sectional view taken on line 21—21 of Fig. 19; Fig. 22 is an end view looking in the direction of arrow A in Fig. 19; Fig. 23 is an end view of the switch actuator for effecting rapid operation of the automatic switch; Fig. 24 is a transverse sectional view through the case taken on line 24—24 of Fig. 29, the view being partially broken away; Fig. 25 is a fragmentary composite sectional and elevational view of the floating connection between the bell crank and brake actuating lever; Fig. 26 is a detailed view of the brake actuating arm; Fig. 27 is a detailed view of the brake applicator arm; Fig. 28 is an end view of the arm shown in Fig. 27; Fig. 29 is a transverse sectional view taken susbtantially on line 29—29 of Fig. 31; Fig. 30 is a transverse sectional view taken substantially on line 30—30 of Fig. 31; Fig. 31 is a view showing the relative arrangement of the power spring and the spring winding mechanism taken substantially on line 31—31 of Fig. 23; Fig. 32 is a plan view of one of the drums employed in driving the switch arms showing the adjustable members thereof; Fig. 33 is an end view of the drum shown in Fig. 32; Fig. 34 is a fragmentary sectional view illustrating how the driving band is adjustably held in place; Fig. 35 is an end view of the coacting drum which connects with the driving bands for driving the switch arms; Fig. 36 is a fragmentary sectional view taken on line 36—36 of Fig. 35 showing the method of fastening the opposite ends of the bands that are fixedly secured on drum 34 and adjustably secured on drum 50; Fig. 37 is a view of one of the adjusting screw terminus members secured to the end of the driving band; Fig. 38 is a plan view of one of the actuating cams employed in the switch actuating mechanism; Fig. 39 is a side elevational view of the cam shown in Fig. 38 and Fig. 40 is a schematic view of the switch system of my invention illustrating one arrangement of circuit system to which the automatic switch may be applied.

Referring to the drawings in detail reference characters 1 and 2 designate the switch arms which are carried in fittings 3 and 4 respectively carried on the insulators 5 and 6. The manner of securing the arms to the insulators is shown more particularly in Figs. 5, 6 and 7 wherein it will be seen that the hardware 3 and 4 are recessed as indicated at 7 to fit over the metallic cap member 8 which is secured by a suitable coating of cement or metallic layer indicated at 9 to the end of the insulator. The cap 8 has a projection 10 thereon which is centrally recessed and screw-threaded at 11 to receive the screw-threaded member 12 which forms the connection means for the flexible cable 14 constituting the electrical connection for the switch arm. Set screws 13 extend through threaded apertures in the hardware 3 and 4 and engage the projecting end of the metallic cap at 10 for firmly securing the switch arm in position with respect to the insulator 5. The hardware fittings 3 and 4 contain arcuate shaped lipped portion 15 through which a set screw 16 may extend for locking the hexagonal head 17 of the screw-threaded terminal member 12 of the flexible cable 14 for insuring firm position of the switch arm with respect to the insulator 5. The switch arms carry at their ends spring contact members which I have illustrated at 18 and 19 shaped to present flat parallel faces to the coacting jaws of the fixed contacts and which are secured to opposite portions of the switch arm. The faces of contacts 18 and 19 are silvered to insure good conductivity under conditions of arcing when establishing connection with the coacting faces of the coacting switch jaws. The switch arm is slotted throughout a portion of its length as represented at 20 to impart sufficient resiliency to the contact members 18 and 19 and thus insure good electrical contact when the contact members 18 and 19 engage between the jaws 21 and 21a of the fixed contactor represented at 22. Conditions of vibration are thereby prevented from displacing or disturbing the contact so that the switch system is applicable in any place subject to vibration. The opposite jaws 21 and 21a have their interior faces coated with a silver lining 21' and 21a' to increase conductivity. The means for securing hardware 22 constituting the stationary contact with respect to the insulator are identical with the means for securing the hardware 3 and 4 constituting the support for the movable contactor or switch arm in order to facilitate production and reduce manufacturing and maintenance costs. The number of replacement parts may thereby be maintained at a minimum. Electrical connection is established with the fixed contact in any suitable manner such as the method explained in connection with the movable contact or through a lug and screw arrangement designated generally at 23. Securing means 13a similar to the securing means 13 for the hardware associated with the movable switch arm are employed for securing the stationary hardware with respect to insulator 6.

I have described the switch arm construction for one of the switches in detail and it will be understood that the other arm is constructed in a similar manner and that corresponding reference characters indicate similar parts. I have illustrated my invention applied to a two-pole single throw switch, but it will be fully understood that the construction may be applied to a double throw system or multiple contact arrangement.

The insulators 5 and 6 are movable with respect to a panel represented at 24 which provides mounting means for the automatic switch operating mechanism, the auxiliary contact system, the driving motor and the motor control mechanism.

Stationary contactor 22 carried by insulator 137 is mounted directly upon the panel by the socket base 25. Socket base 25 is suitably secured by flange bolts 26 to panel 24. The movable insulators 5 and 6 are each supported as illustrated in Figs. 9 and 10. Insulator 5 is secured in a socket member 27 which is secured in any suitable manner to the flange member 28 carried by the shaft 29. Shaft 29 is journaled in sleeve bearing 30. The sleeve bearing 30 is oilless and does not require lubrication. It is supported in housing 31 which forms part of the base casting 32 secured to the panel by through bolts represented at 33. The sleeve bearing 30 extends the full length of the housing 31 which terminates in a position forming an abutment for the hub portion 32 of the drum 34. Drum 34 has two peripheral grooves 35 and 36 within which the driving bands 37 and 38 operate. Drum 34 also carries stud bolts 39, 40 and 41 each of which include spacing sleeves 39a, 40a and 41a thereon. The spacing sleeves serve as supporters for the cam members represented at 42, 43 and 44 shaped as illustrated in Figs. 11 and 12. The end members of each of the stud bolts are formed from insulation material represented at 39b to insure against electrical breakdown between the metallic casting or housing 32 and the stud bolt fastening screws indicated at 39c. Similar insulated end members are provided on the coacting stud bolts. The cams are supported at spaced peripheral distance by the three stud bolts 39, 40 and 41 as shown more particularly in Fig. 18. These cams each have preformed faces thereon represented at 42a, 43a and 44a serving as actuators for the movable auxiliary switch contact arms shown at 45, 46 and 47. The movable auxiliary switch contact arms each carry pairs of roller members formed from insulation material represented at 45a and 45b which roll over the cam surface of the coacting actuator cam for moving the switch arm about its central pivot illustrated at 45c for rocking the switch arm into either the jaw contacts 45d or jaw contacts 45e. The actuating rollers carried by the auxiliary switch arms are represented more clearly at 45a, 46a and 47a in Fig. 9 operative with the respective cam surfaces 42a, 43a and 44a. The sets of stationary contacts are shown in Fig. 9 at 45d, 46d and 47d. The arrangement of the stationary contacts is illustrated in Fig. 15 from which it will be seen that each stationary contact is formed by a pair of spaced parallel extending metallic plates 45f to which the contact members constituting the stationary contacts 45d are riveted or otherwise secured. A connecting member in the form of a block 45g is disposed between the parallel plates 45f and includes a terminal screw 45h therein for establishing connection with the sets of contacts 45d. This same arrangement is repeated for the center support of the contact arm 45 at 45i and the opposite set of contacts 45e at 45j. It will be understood that the sets of stationary contacts and the center support for the switch arm are constituted by separate metallic plate members 45f secured to opposite sides of the strip of insulation shown at 48 which extends between the limits which I have indicated at 45k and 45l.

Each of the sets of stationary and auxiliary contacts include separate mounting means for the switch arms and separate terminals for the centers of the switch arms and for the sets of contacts with which the switch arms are arranged to coact.

The drum shown at 34 coacts with a drum 50 which is associated with the movable shaft 6. Drum 50, however, is formed differently than drum 34 as represented more particularly in Figs. 31, 32 and 33 as provision is made for the tightening of the bands and the adjustment of contact arm 6 in order to insure proper alignment of the switch arms with respect to the stationary contacts. Drum 50 contains annular grooves 51 and 52 with lugs extending into the path thereof represented at 53 and 54 respectively around a chordal portion 55 of the drum. Each of the lugs is apertured to receive adjustably screw-threaded bolt members 56 shown more particularly in Fig. 36. The bolt members 56 are bifurcated at their ends and are attached to the bands shown at 37 and 38. The opposite ends of the bands 37 and 38 terminate under screw heads 57 and 58 engageable in the periphery of drum 34 as illustrated in Figs. 34 and 35. It will be observed that the ends of the bands 37 and 38 are reinforced as represented, for example, at 37a to enable them to be secured under the securing screws such as 57 and 58 in drum 34 and allow precise control of effective length. The adjustment is made by tightening or loosening the adjusting nuts 56a on the coacting screw-threaded bolt member such as 56 in Fig. 33. Thus adjustability may be effected on drum 50 while permanent connections are established on drum 34. The drum 34 is provided with screw-threaded openings into which fastening screws 59 may be inserted for securing bracket member 60 in position. Bracket member 60 with the drum 34 on which it is mounted constitute a crank by means of which the rotation through 180° of the shaft 67 is changed to oscillation through a smaller angle of the shaft 29. Shaft 67 has discs 62 and 63 mounted thereon. The discs 62 and 63 are shown more particularly in Figs. 3, 4, 23, 31, 38, 39 and 40. Discs 62 and 63 have notches therein which engage to hold the shaft 67 on which they are mounted from rotation.

There are two discs as shown clearly in Fig. 40, one of which is shown at 62 and the other of which is shown at 63. Discs 62 and 63 are exact opposites of each other and have opposite actuating faces 62b and 63b. The link 61 is pivotally connected to the stud bolt 64 which is pivoted in disc 63 but passes loosely through disc 62 as clearly shown in Fig. 4. The two discs are mounted on shaft 65 which has two flat portions 66, one on each side thereof. One disc 62 is recessed at 68 to receive the head of the retaining screw 69 which connects to the tapped portion of shaft 65. The two discs 62 and 63 also have internal flat faces shown at 62a and 63a respectively to engage upon the coacting flat faces of the projecting end of the shaft 65 thus keying or locking the discs 62 and 63 to rotate fast with the extension of shaft 65 shown at 67. Extension shaft 67 extends transversely of the casing 68 and is journaled therein at opposite ends represented at 69 and 70. The bearing 70 is supported in the base plate 71 carried on the upper section of casing 68 by spacer members indicated at 72 held in place by screws 72a.

The shaft 67 thus journaled has an enlarged section which is screw-threaded which is represented at 73. Below the screw-threaded section 73 are two flats represented at 74 on which there is mounted a cam 75 which turns with the shaft 67. A traveling nut 76 is arranged to move over the screw-threads 73 and traverses a path extending parallel with the shaft guided by two studs 77 and 78 which pass through coacting apertures in traveling nut 76. On traveling nut 76 there is carried a projecting cam face 79 which is arranged to coact with face 80 of the cam 75 when the nut approaches its limit of travel on screw-threads 73 to restrict the unwinding of the spiral spring 85. The studs 77 and 78 are carried by worm gear 81 as shown. The base portions of the mounting means for studs 77 and 78 are cut away at 77a and 78a to allow clearance for the cam 75. The worm gear 81 has a sleeve portion 83 rotatably mounted on shaft 67 within the spring case shown at 84. The spring case 84 houses flat spiral spring 85 which is secured at one end to the case 84 and at the opposite end to the sleeve 83. The bushing 87 of the spider gear wheel 132 is pinned to the shaft 67 as represented at 88. The spider gear wheel 132 forms one end of the spring case 84. The spring case 84 remains stationary while spring 85 is being wound.

The manner of winding the spring 85 will be more clearly understood by considering the arrangement of the driving motor 89 which is supported on panel 24. Motor 89 may be of any desired type for driving shaft 90 through suitable coupling 91 which connects to shaft 92 journaled in bearing 93 in the side wall of casing 68 terminating in pinion 94. Pinion 94 engages with the gear 95 which is carried by shaft 96. Shaft 96 is journaled in bearings 97 and 98 in opposite ends of the casing 68 and carries worm gear 99 thereon which engages with the worm wheel 81. Thus the driving motor 89 is enabled to rotate sleeve 83 which is connected to spiral spring 85 for winding spiral spring 85 within spring case 84. During this winding operation the traveling nut 76 moves away from the cam 75 on screw-thread 73 and at the limit of its travel engages pin 100 which acts upon arm 101. Arm 101 is pivoted on block 102 on the exterior of casing 68. An extension 103 on arm 101 is operated to engage operating member 103' of micro-switch 104. Micro-switch 104 is arranged in the motor circuit or in circuit with a relay that is arranged in the motor circuit and thus opens the power circuit to the motor when the spring 85 has been wound to a predetermined tension. The spring 85 is thus operative to control the operation of the automatic switch.

Mounted on the sub-base of the casing 68 I provide a solenoid 105 having an armature member 106 which is pivotally connected at 107 with arm 108. Arm 108 is pivoted at 109 on casing 68. The angular movement of arm 108 is restricted by bracket member 110. A counterweight 111 is carried by the movable arm 108 and is connected through spring 112 to the fixed stud 114 on casing 68 thus tending to maintain the arm in the full line position illustrated in Fig. 3. The arm 108 carries a movable bracket member 115. Bracket member 115 is bolted to bell crank 116 which is in turn pivoted at 117. The opposite end of the bell crank 116 shown at 118 is movable beneath washer member 119 (Fig. 23) mounted on stud 120 projecting from casing 68. Arm 121 is also mounted on stud 120 and is free to move angularly about stud 120. Bell crank 116 is pivoted on stud 117 which is fastened in lever arm 121 so that when bell crank 116 moves it shifts arm 121 in an angular path and applies a brake band represented at 122 to the brake drum shown at 123. Brake band 122 is normally loose about drum 123 by action of spring 127 pressing against the end of lever arm 121 tending to slack off on the brake band 122. A spring 124 is arranged to maintain bell crank 116 against stud 125 which in turn maintains arm 121 in a position in which brake band 122 is unapplied. However, upon shifting of the bell crank 116 against the action of spring 124 when disc 63 operated by engagement with curved face 116a of bell crank 116 the bell crank moves back imparting motion to lever 121 applying tension to brake band 122 and establishing frictional contact with brake drum 123. The lever 121 and bell crank 116 are floating with respect to each other or pin 117 under tension by spring 124 and as bell crank 116 shifts it imparts motion to lever 121 which in turn increases tension on spring 127 through which stud 126 extends. Stud 126 in turn connects to the end of brake band 122 for thereby applying the frictional brake in accordance with the angular displacement of lever 121. It will be observed that bell crank 116 has the end at 116a thereof so shaped that it is engaged by the curved face 62b of disc 62.

Bell crank 116 has limited angular movement about inclined faces 121a and 121b of the lever 121 by reason of the enlarged and curved wall bore 116b and the rocking thereof under control of solenoid 105 for shifting the end 116a of bell crank 116 into either the plane of disc 62 or disc 63.

Without any current on the solenoid 105 bell crank 116 will be engaged with the lower cam 63, the power circuit being open through control switch 135. When current is applied form source 136 by closing switch 135 to the solenoid 105, the solenoid pulls in armature 106 rocking arm 108 (Fig. 3) about its pivot 109 and in turn moving bell crank 116. The movement of bell crank 116 shifts the abutment face 116a thereof from a position aligned with disc face 63b to a position aligned with disc face 62b. It will be observed that disc 63 is the exact counterpart of disc 62. The engaging surface at 63b is curved in the manner similar to the curved surface 62b of disc 62. When solenoid 105 is deenergized the bell crank 116 drops back by gravity to a position in which the end thereof is aligned with curved face 63b of disc 63. The curved surface 62b of disc 62 has the tendency of keeping bell crank 116 in engagement by confining the end of the bell crank by drawing the bell crank inwardly rather than forcing the bell crank away which would be the situation if the disc face were flat or radial and not preformed in a curved face as provided herein. Thus the spring 85 consituting the spring motor can drive the insulators 5 and 6 to certain predetermined limits determined by abutment of faces 62b or 63b with face 116a.

Flywheel 128 is carried by shaft 129 which is journaled at 130 and 131 in the casing 68 and frame 71 forming part of sub-base 71. The flywheel 128 insures a uniform speed of movement of the switch arms when the spring motor becomes effective to move the arms. The shaft 129 carries pinion 132' which meshes with the spider gear wheel 132 that forms part of the spring housing 84. Shaft 129 extends beyond case 68 and carries the brake drum 123 which is engaged by the brake band 122 operating as hereinbefore explained. The flywheel imparts sufficient inertia to the system to retard the spring from excessive speed of operation when the spring initially takes over control of the switch arms.

While I have described my invention in one of its preferred embodiments, I realize that modifications may be made in the details and arrangement of the switch system and I desire that it be understood that my invention is not limited to the particular structures shown but may be changed as to detail within the scope of the appended claims.

What I claim and desire to secure by Letters Patent of the United States is as follows:

1. Control mechanism for electric switches having paths of travel approximately 90 degrees, means for driving the electric switches in successively opposite directions for successive repeat operations in opposite directions, means for driving the aforesaid means comprising a spring motor, a shaft extending from said spring motor to said first mentioned means, opposed disc members carried by said shaft and having notches therein, an angularly shiftable pawl selectively movable into the path of either of the notches on said disc members and electrically actuated means for alternately shifting said pawl into the path of the notches on said respective disc members for forming a limiting abutment for the travel of said switches in either of the opposite directions and means for restoring tension in said spring motor.

2. Control mechanism comprising driving means, a driving shaft rotatable by said driving means, a driven shaft, reversing means disposed between said driving shaft and said driven shaft for successively operating said driven shaft through alternate angular distances of approximately 90 degrees, a pair of disc members associated with said driving shaft and having notches therein forming stop devices, an angularly displaceable pawl selectively shiftable in abutting position with either of the notches of said disc members for limiting the travel of said driving shaft to a position in which the driven shaft completes rotative movement to a limit of approximately 90 degrees from the initial position thereof, and electromagnetic means for selectively displacing said pawl.

3. Control mechanism comprising driving means, a driving shaft rotatable by said driving means, a driven shaft, means disposed between said driving shaft and said driven shaft for successively operating said driven shaft through opposite angular distances of approximately 90 degrees, a pair of disc members associated with said driving shaft each having stop members in the peripheries thereof, an angularly displaceable pawl selectively shiftable in abutting position with either of the stop members of said disc members for limiting the travel of said driving shaft to a position in which the driven shaft completes rotative movement to a limit of approximately 90 degrees from the initial position thereof, electromagnetic means for selectively displacing said pawl, and brake means associated with said driving shaft for effectively limiting the driving torque applied to said driving shaft upon engagement of said pawl with the stop members in either of said disc members.

JOSEPH F. FRESE.

REFERENCES CITED

The following references are of record in the file of this patent:

UNITED STATES PATENTS

| Number | Name | Date |
| --- | --- | --- |
| 541,543 | Herdman | June 25, 1895 |
| 645,103 | Jones | Mar. 13, 1900 |
| 1,028,993 | Cheney | June 11, 1912 |
| 1,123,282 | Harris | Jan. 5, 1915 |
| 1,554,718 | Dryer | Sept. 22, 1925 |
| 1,740,405 | Kearsley | Dec. 17, 1929 |
| 1,959,522 | Bullard | May 22, 1934 |
| 2,311,714 | Thompson et al. | Feb. 23, 1943 |